United States Patent [19]

Orsen

[11] 4,318,617
[45] Mar. 9, 1982

[54] DC SHIFT ERROR CORRECTION FOR ELECTRO-OPTICAL MEASURING SYSTEM

[75] Inventor: Stefan Orsen, Fairlawn, N.J.

[73] Assignee: Keuffel & Esser Company, Morristown, N.J.

[21] Appl. No.: 103,778

[22] Filed: Dec. 14, 1979

[51] Int. Cl.³ ............................................. G01B 11/14
[52] U.S. Cl. .................................. 356/373; 33/125 C; 250/237 G
[58] Field of Search ........................ 356/373, 374, 375; 250/237 G, 231 SE; 33/125 C

[56] References Cited
U.S. PATENT DOCUMENTS 4,180,704  12/1979  Pettit ............................... 250/237 G Primary Examiner—R. A. Rosenberger
Attorney, Agent, or Firm—Lionel N. White

[57] ABSTRACT

In an electro-optical measuring system which utilizes a sin/cos signal pair to determine the extent and direction of physical displacement, measurement errors often occurring as a result of extraneous DC level shifts in generated signals are corrected in a procedure which regularly samples the maxima and minima of the signals, derives from those values the median DC levels of the signals, compares the median levels to a reference DC level in the system to determine any differences, and applies any detected differences as corrective factors to position measurement signal values.

9 Claims, 4 Drawing Figures

DC SHIFT ERROR CORRECTION FOR ELECTRO-OPTICAL MEASURING SYSTEM

BACKGROUND

Numerous electro-optical measuring systems currently available for providing an indication of displacement, either linear or rotary, are based upon the relative movement between at least a pair of ruled elements, such as amplitude or phase gratings, arranged in a beam of light. Such movement of one of the grating elements with the displacement to be measured results in a variation in the light transmissivity of the grating pair which can be sensed by a photoelectric detector. Regular movement between the grating elements produces a sinusoidal waveform signal which may be utilized in counter and resolver circuitry to provide an indication of displacement in terms of units and fractions of units of the basic grating pattern.

Typical of such electro-optical measuring systems are those described in U.S. Pat. Nos. 2,685,082; 2,886,717; 3,244,895; and 3,768,911. Such systems also include a second photoelectric sensor, or pick-up element, spacially displaced along the grating pattern in such a manner as to provide a second sinusoidal waveform signal in phase quadrature with the first signal generated by movement in the system. Such sine/cosine signals pairs may be utilized in appropriate circuitry as a means of distinguishing the direction of displacement in order to ensure an accurate tally of counts of unit distances displaced.

In the noted systems and other similar displacement measuring devices the sin/cos signals are normally compared with a preselected reference voltage in order to derive square waveforms which may be utilized directly in counting circuitry and in resolver circuitry for accurately determining fractional unit displacements. While the reference DC voltage level is preferably selected and readily maintained at the median of the working voltage range in a system, it is frequently difficult to ensure a constant intensity range of the signal output from a pick-up system due to the numerous extraneous physical influences associated with the mechanics of the measuring system as a whole. For example, there may exist mechanical errors in the rulings of a grating system such that a greater or lesser amount of light may be transmitted as a result of the error rather than of an actual displacement of the gratings. Thus an overall shift in the DC level of the detected signal may appear as such a displacement.

Similarly, an accumulation of dust on the grating, or a scratch or blemish resulting from use may result in erroneous signal changes falsely indicative of movement. Further variations in light intensity, which may be interpreted by the system as a displacement, may result from physical movement of the photoelectric sensor, or the light source, closer to or farther from the gratings. Extraneous light noise may also introduce displacement-simulating errors.

In order to eliminate the erroneous indications of displacement resulting from such normally uncontrollable variations in the pick-up output signal level, it is necessary that the existence of a DC level shift in the signal be recognized and that the extent of such a shift be determined and accounted for by the system. The present invention provides a means for so noting and correcting errors which might otherwise result from extraneous influences.

SUMMARY

As noted, the initial step in remedying a signal level shift error is to recognize the existence of such an error in order that appropriate corrective action may be taken. In the present invention, the existence of a shift in overall pick-up output signal level is detected in a procedure which comprises measuring the amplitude of the sinusoidal signal at the maximum and minimum of each cycle and comparing the average of these measured intensities to the nominal reference voltage utilized in the measuring circuit.

Since most measuring systems of the type under consideration utilize at least a pair of pick-up elements in order to generate a pair of signals in phase quadrature for use in distinguishing direction of movement, there is provided a practical means for making the amplitude measurements at the appropriate time. That is to say, each of the sine and cosine signals generated in the respective pick-ups may be utilized in crossover detector circuitry to trigger a measurement of the other signal, since a "zero" crossover of one of these signals occurs at substantially each of the maximum and minimum values of the companion sinusoidal waveform. Thus, by digital or analog means, the average of the maximum and minimum values of each cycle of the respective signals may be determined and compared with the reference DC level and, since any difference between such average and the nominal reference is indicative of an extraneous shift in the signal level, the condition for a potential error detected.

An erroneous overall DC shift in signal level, vis-a-vis a change in signal intensity resulting from an actual displacement to be measured, having been recognized, it is necessary that corrective action be taken lest the shift result in an error in measurement. While in some systems a potential error may be avoided by either discounting any data obtained during the occurrence of a DC level shift, or by repeating the questionable measurement, these procedures are impractical in systems of the type presently under consideration, since in the first instance the discounting of data, particularly in incremental counting systems, compounds the error to be avoided, while in the other, a repetition of measurement may be futile, since a signal level shift resulting from dust or grid imperfection will simply be repeated.

The preferred solution to the problem then is a determination of the extent of DC level shift with the application of a sufficient correction to the indicated displacement so as to remove any error occasioned by the otherwise uncontrollable DC shift.

In accordance with the present invention, a signal shift error is corrected either digitally or in an analog manner. In the former approach, calculating or computing means normally associated with the more advanced electrooptical measuring systems may be utilized to determine the extent of DC shift error and to apply the error directly as a correction during the measuring procedure. An analog correction, on the other hand, may be effected continuously during the operation of the measuring device by averaging the measured max/min values of the pick-up signal cycles and feeding the average value back into the circuitry so that the reference DC level is shifted with the median of the shifting signal in order to maintain a close relationship between those levels and minimize any attendant error.

DRAWINGS

DESCRIPTION

Figure 1:
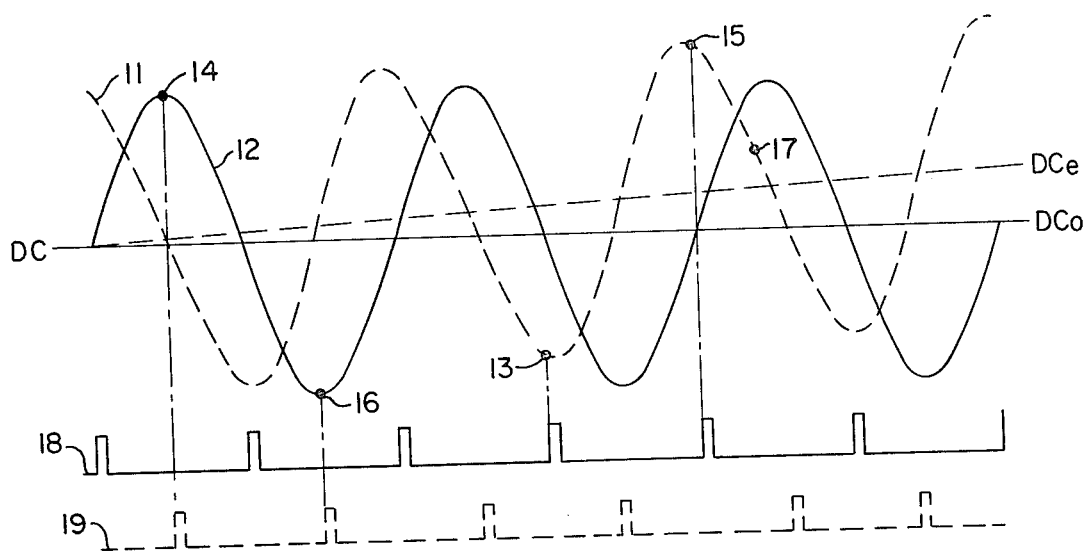
FIG. 1 is a graphic representation of a sin/cos signal and related sampling signal pulses in a digital embodiment of the present invention.

Referring to FIG. 1 of the drawings, one will observe a representation of a pair of sine/cosine signals 11,12 of which the cosine is shown to be increasing in overall value due to a DC level shift resulting, for example, from a mechanical defect in a scale element of an electro-optical measuring system. While the sine signal waveform 12 appears to be substantially stable about the reference voltage level, DCo, of the system, the cosine signal 11 is shifting away from its companion sine signal, following its shifting median level, DCe. The cosine signal will thus be seen to be in error due to such signal shift at any given time by an amount approximately equal to the difference between DCo and DCe.

Such a signal shift error, if within reasonable limits, has no significant effect in an incremental measuring system, since the tally of whole signal cycles is generally unaffected. Resolution of displacement within a given signal cycle, however, is significantly affected by a signal level shfit, since such displacement is directly related as a trigonometric function of the signal value at the time of measurement. Thus, for example, the value at point 17 on the cosine signal 11 would normally be measured relative to a predetermined reference voltage level, DCo, which may be considered for purposes of the present discussion to be ground level, with the generated pick-up signals varying over some nominal range, e.g. ±8 volts. As will be seen in FIG. 1, the measured value at point 17 is greater by the amount of the shift error at that time, and thus indicates less displacement, i.e. phase of the cosine signal, than if the measurement at point 17 were properly taken with respect to that signal's own shifted median, DCe.

Thus, in accordance with the present invention, correction of the DC level shift of a generated signal is based upon a determination of the median value of the signal in the vicinity of the point at which a position measurement is taken and a comparison of that median with the reference voltage level in the system. Such a determination and comparison may be accomplished in a digital measuring system comprising the circuit shown schematically in FIG. 2. As will later be discussed in greater detail, each of the sine signal 12 and cosine signal 11 generated during displacement on the scale of the system is alternately compared to the predetermined reference voltage level, DCo, to eventually generate series of triggering pulses which are used to regularly sample the values of each of the sin/cos signals at or about their maxima and minima. From these values are calculated the levels of the medain, DCe, of each half-cycle of the respective sin/cos signals. As each such median is calculated it is compared with the reference level, DCo, and the difference, indicative of a DC level shift in the signal, is applied mathematically to any position measurement signal value taken during the ensuring half-cycle in order to substantially eliminate the value error resulting from any DC level shift of the signal.

As represented in FIG. 1, a triggering pulse in a series 18 is generated in response to each crossover of sin signal 12 with respect to the system reference level, DCo. Likewise, in the present example, cos signal 11 generates a triggering pulse series 19 related to its crossovers at DCo. These triggering pulses derived from each signal are utilized as represented in FIG. 1 to effect continuously, during physical displacement in the system, the sampling of the companion signal generated in the pick-up. For example, triggering pulses of series 19 generated at the cos signal crossovers will effect the measurement of the sequential maximum 14 and minimum 16 values of sin signal 12. Since this signal will normally exhibit a consistent variation about its median over the period of one half-cycle, e.g. between the measuring points 14,16, calculation of the average between those two values will provide the value of that median. Any difference resulting from a comparison of the calculated median with the reference, DCo, will then indicate a signal shift and herald the need for an appropriate correction to be made with respect to any measured value taken during the following signal half-cycle. In the example under consideration it will be observed that the sin signal is stable with respect to DCo, since the median of the values at points 14,16 coincides with that reference level.

In like manner, pulses 18 derived from the sin signal crossovers are used to sample the cos signal, as at points 13,15. While these measured values 13,15 are slightly offset from the precise minimum and maximum values of the cos signal due to the shift error in that signal, their average nonetheless effectively determines the correct signal median value, DCe, for the intervening portion of the cos cycle. Use of this computed median value, DCe, as the reference with respect to any position value 17 taken within the adjacent cos signal half-cycle will provide a substantially correct displacement measure without the error attendant a measurement referred to the regular system reference level, DCo.

Figure 2:
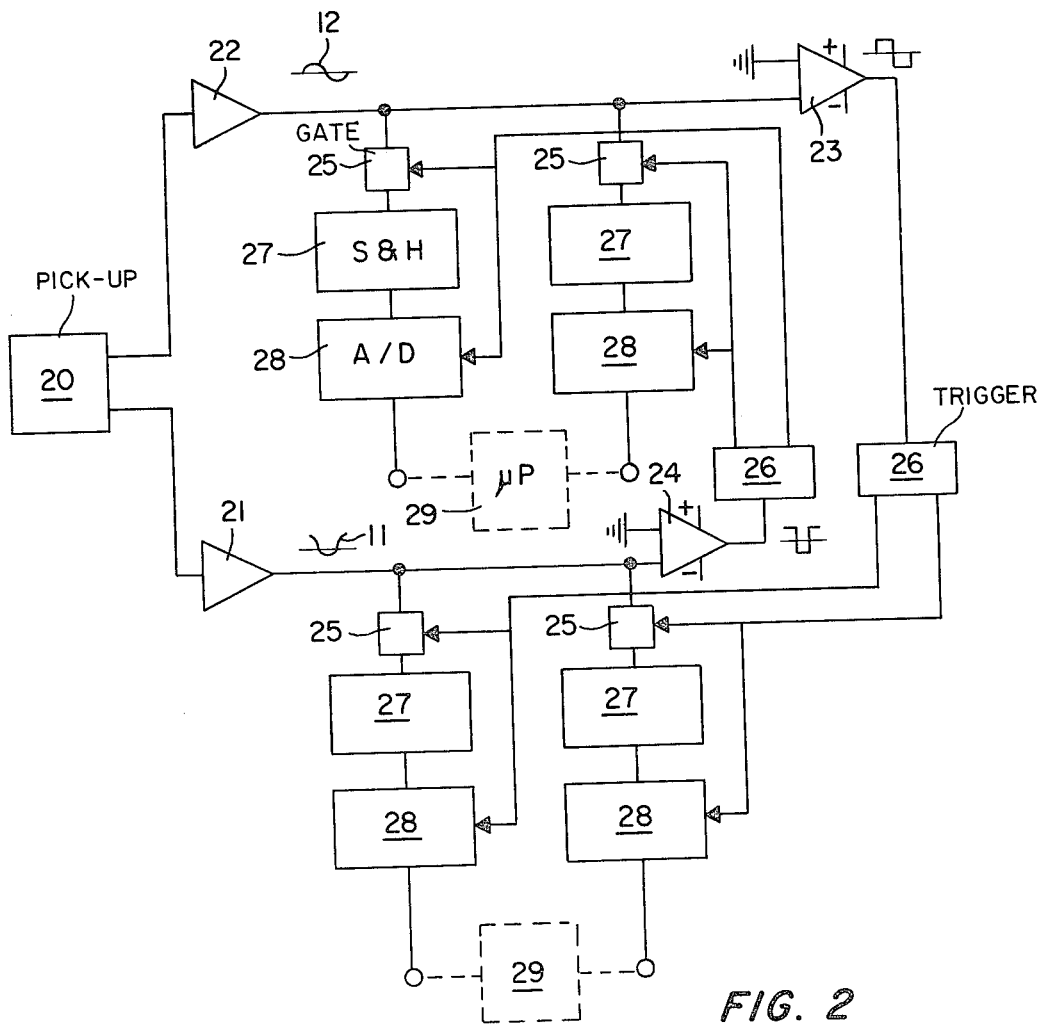
FIG. 2 is a schematic representation of a signal sampling circuit utilized in said digital embodiment.

A circuit as shown schematically in FIG. 2 may be utilized in the present system to obtain the noted measurements indicative of any signal shifts which may occur as a result of extraneous causes such as mechanical instabilities in the system. This circuit comprises the usual electro-optical pick-up head 20 which generates the noted sin/cos signal pair which are respectively directed to separate channels where they are typically amplified at 21,22 to yield the representative analog signals 11,12 of which the cos signal 11 is shown as being shifted upwardly away from the reference level DCo as earlier described.

Following the sin channel, it will be seen that the analog signal 12 is converted to square wave form in comparator 23 which is referenced to DCo, or ground in the present exemplary system, the square wave signal being then directed to trigger logic 26 which may be of any known type providing a pulse at each of the negative and positive transitions of the square wave input. The resulting trigger pulses are then directed to respective cos channel gates 25,25 to effect min/max sampling measurement of analog cos signal 11, as for example at points 13,15 represented in FIG. 1.

The min/max cos signal values thus gated are registered in respective sample & hold devices 27,27, converted to digital values in A/D converters 28 which also operate under the sampling trigger pulse, and transmitted to RAM devices associated with the system's microprocessor represented at 29. These RAM data storage elements are thus continually updated with the digital values of the alternating max and min cos signal values for use at the time of a position measurement in order to determine the applicable median value to be employed for correcting the measured value. The cos signal in like manner generates the series of triggering pulses 19 which sample the companion sin signal for transmission in digital form to the RAM elements in microprocessor 29.

At the time a position measurement is made in the digital scheme example, the microprocessor of the system calls for the gating of the signal level value, as at 17, for conversion, in the manner of the max/min value sampling, to digital form and transmission to RAM storage. The value thus recorded will, however, be of an absolute value, referenced to DCo, and will therefore be in error as an indicator of true phase position along the cos cycle due to the indicated DC level shift of the cos signal away from the DCo reference. In order to provide a proper cos value, Vc, for position phase determination, the current recorded values of the most recent cos signal maximum, Mx, minimum Mn, and absolute measured value, Va, as well as the reference level, DCo, are analyzed in the microprocessor to determine the extent of the shift error and to apply the same as a correction to the erroneous measured value.

In the exemplary system, a preferred correction analysis proceeds in the following manner. The proceding error median, $DCe = (Mx + Mn)/2$, is determined and its shift error with respect to the reference level, $DCe - DCo$, calculated. This error is then removed from the absolute measured position value to obtain the corrected cos signal phase value, $Vc = Va - (((Mx + Mn)/2) - DCo)$.

In addition to the foregoing correction of error due to DC signal level shift, it is advantageous and preferred in the present digital system to correct any additional error which might be occasioned by a change in amplitude, such as might result from a failing DC supply source. In such an event the proper DCo might be maintained, yet the measured position signal value would be in error due to a reduced signal amplitude. To correct such a condition the actual signal amplitude range, $Mx - Mn$, is compared to the nominal DC supply range, V, and the result applied to the corrected signal phase value to obtain a cos value which is normalized to a scale at which the actual cos phase determination is designed to be effected, $Vc_n = (Va - (((Mx + Mn)/2) - DCo)) \times (V/(Mx - Mn))$.

The companion sin signal may be similarly analyzed and corrected, if required, to maintain the proper relationship of the signal pair and to ensure accurate resolution of displacement measurements to fractional parts of the system scale cycle. Although the circuitry of FIG. 2 depicts each sampling branch as having a full compliment of described devices, i.e. gate, S&H, and A/D, fewer gates and conversion elements would be required through the use of multiplexing and gates addressable by the microprocessor to achieve an ordered sequencing of signal samples for RAM update. Such a multiplex arrangement could readily service any number of pick-up elements, for example those included in an electronic theodolite to provide multiple signals for the measurement of elevation as well as azimuth of the instrument line of sight.

In measuring systems where it is anticipated that there may occur signal shifts of particularly large magnitude it is preferable to effect the correction of such shifts in an analog rather than a digital arrangement. While the digital embodiment of the present invention is sufficient in applicability to rectify signal shift errors in the more precisely built measuring systems, such as the noted theodolite, an analog system, for example as shown schematically in FIG. 3, is preferred with more coarsely structured systems or with those intended for use in environments which render the measuring system more susceptible to extraneous errors.

Figure 3:
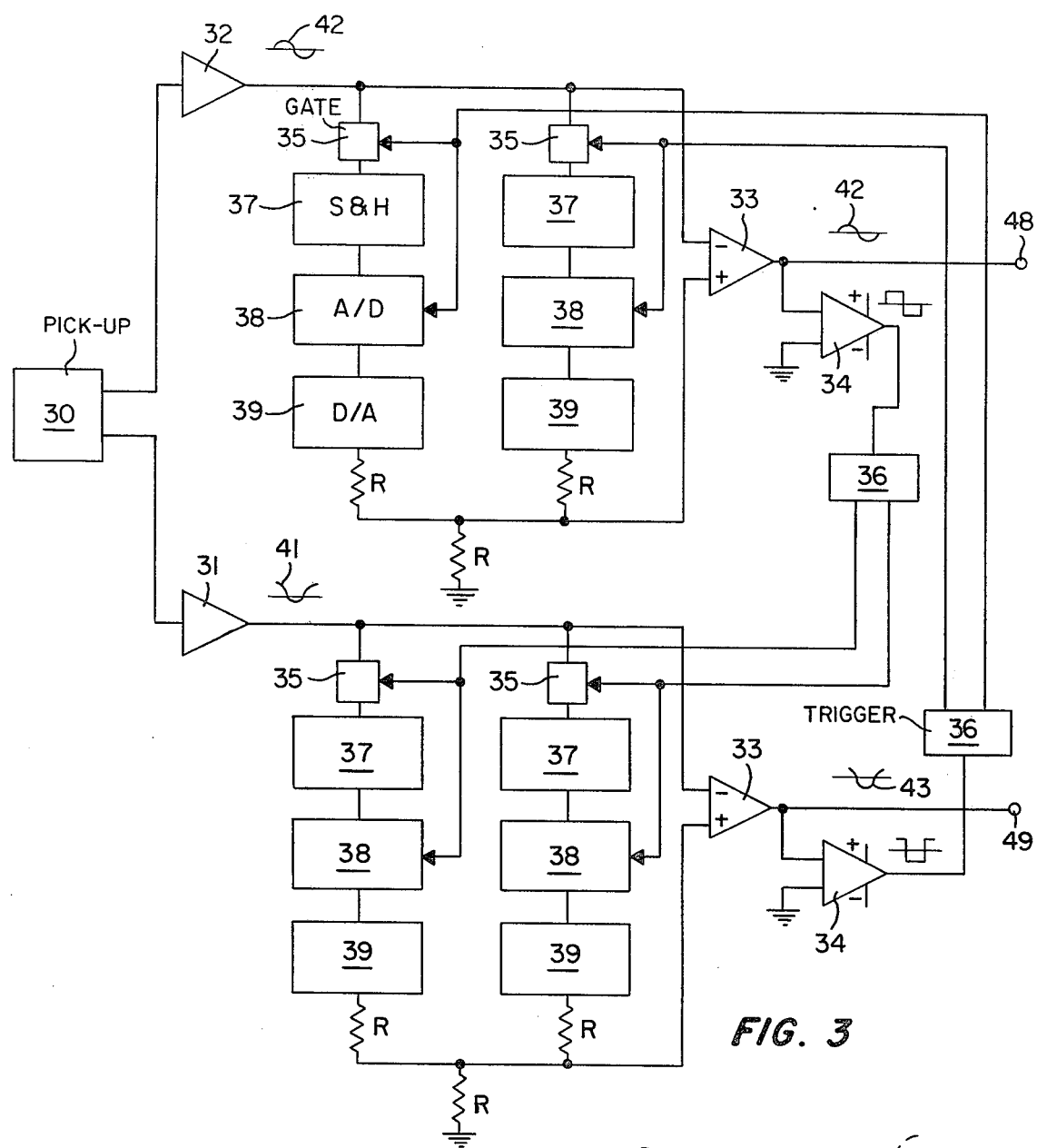
FIG. 3 is a schematic representation of a signal sampling and correction circuit utilized in an analog embodiment of the present invention.

Referring to FIG. 3, sin and cos signals 42,41 generated in electro-optical pick-up 30 are amplified in separate channels at amplifiers 32,31. As in the earlier example, the cos signal 41 is considered as being shifted upward from the system reference level, DCo, due for example to mechanical influences, while sin signal 42 is considered to be without error, i.e. regularly varying about reference ground. The sampling pulse series 46 (FIG. 4) orginating with the crossovers of sin signal 42 are derived, as in the previous example, by a squaring of the signal at comparator 34 and application of a trigger-forming logic 36, the sampling trigger pulses being directed to cos channel gates 35,35.

As previously described, cos signal 41 carrying the shift error is sampled alternately near its maximum and minimum values, each of such values being conducted through sample & hold device 37 to A/D converter 38. This latter device is used in order to avoid a decay in the level of the measured value in the event that regular sampling is interrupted for any substantial length of time, for example where the measuring system remains stationary during the making of a position measurement. Each digital value is then again converted in respective D/A converter 39 at the output of which the most recent maximum or minimum value of the erroneous signal is applied to a balanced resistor network to derive the average or median value of each max/min sampling. This median value is applied along with the erroneous cos signal 41 as input to differential amplifier 33, the output of which is shifted by virtue of the varied median value input to provide a cos signal 43 which correctly varies about DCo, i.e. reference ground. The corrected cos signal then becomes available at 49 for application to the usual squaring and counting circuits, and analog resolvers where measurements of less than whole cycle are obtained. The corrected cos signal 43 is also applied to comparator 34 to obtain a more properly sequenced square wave input to logic circuit 36 from which is obtained the sampling pulse series 47 which controls the sampling gates and A/D converters of the sin channel sampling circuit.

Figure 4:
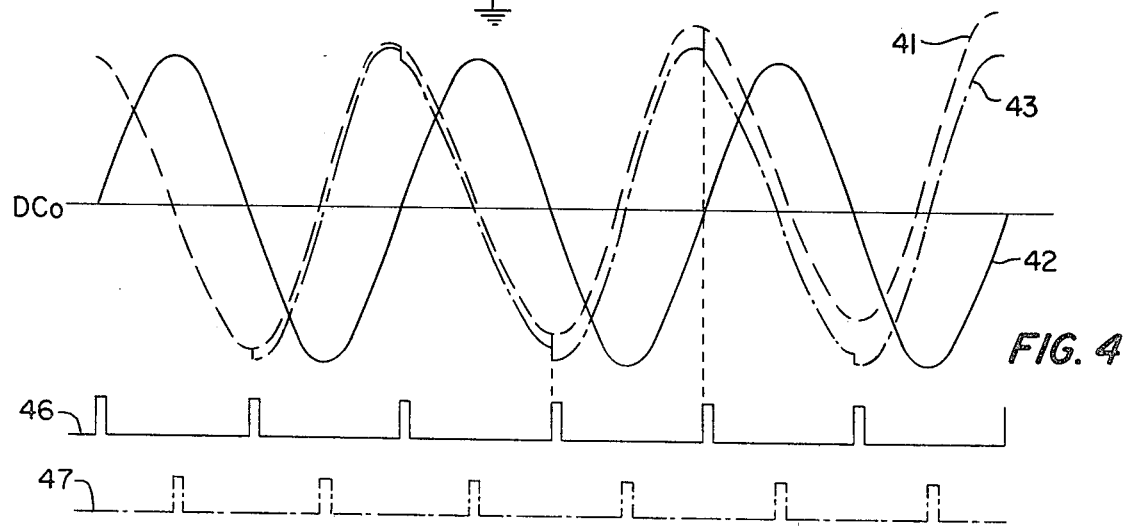
FIG. 4 is a graphic representation of a sin/cos signal pair, a corrected cos signal, and related sampling pulses in said analog embodiment.

The effect of the analog correction circuit can be seen in FIG. 4 from a comparison of the representative wave form of the erroneous cos signal 41 and that representing the corrected signal 43. At each sampling of the respective maximum and minimum values of the erroneous cos signal 41, with resulting change at the output of related D/A converter 39, the value of the median of the latest max/min value pair appears as the reference input to differential amplifier 33. The result of such change is that the next half-cycle of the cost signal appearing at the output of amplifier 33 is driven to a position with respect to system reference, DCo, which is substantially balanced about that reference level. Thus as each half-cycle is sampled for maximum or minimum value, a correction is derived and applied to the subsequent half-cycle to maintain the signal input at 48,49 relatively devoid of the DC shift error.

A further advantageous effect of the described analog correction circuit results from the fact that, since any error in a signal is corrected at each half-cycle, the regular alternating sequence of the transition in squared sin/cos signal pairs normally essential to the proper functioning of incremental counting systems is maintained. Thus shift errors of such magnitude as might otherwise result in lost counts in such incremental systems are overcome and the accuracy of the measurement maintained. It should be apparent, of course, that this advantage may be enjoyed as well in a predominantly digital system as earlier described by means of a hybridization of the relevant segments of each circuit.

What is claimed is:

1. A method of correcting errors resulting from the DC level shift, with respect to a preselected reference voltage, of a sinusoidal electrical signal generated in an electro-optical measuring system in response to displacement to be measured, said method comprising:
   (a) generating a second signal in phase quadrature with said sinusoidal signal;
   (b) gating a sampling amplitude value of said sinusoidal signal whenever the amplitude of said second signal equals said preselected reference voltage, thereby to obtain an indication of the amplitude values of said sinusoidal signal at substantially the maximum and minimum of a given cycle of said sinusoidal signal;
   (c) averaging said sampled values to obtain an indication of the median amplitude of said sinusoidal signal cycle; and
   (d) shifting the amplitude values of the sinusoidal signal half-cycle adjacent said median toward the value of said reference voltage by an amount equal to the difference between said median and said reference voltage.

2. The method according to claim 1 wherein said averaging and shifting steps comprise converting said maximum and minimum amplitude values to representative digital values, computing the arithmetic average of said digital values, and subtracting said average from the representative digital value of any signal amplitude measured in said adjacent signal half-cycle.

3. The method according to claim 2 wherein said averaging and shifting steps comprise applying said maximum and minimum amplitude values as input to a resistor bridge circuit the output of which is a voltage level equal to the arithmetic average of said input value levels, and applying said sinusoidal signal and said average level as inputs to electrical circuit means at the output of which said sinusoidal signal median is shifted in response to said average level input.

4. The method according to claim 3 wherein said electrical circuit means comprises a differential amplifier.

5. In an electro-optical measuring system which comprises generating a sinusoidal electrical signal in response to displacement to be measured and relating the amplitude of said signal to a preselected reference voltage to provide an indication of the extent of said displacement, an improvement which compensates for extraneous shifts in the level of said signal, said improvement comprising:
   (a) generating a second signal in phase quadrature with said sinusoidal signal;
   (b) gating a sample amplitude value of said sinusoidal signal whenever the amplitude of said second signal equals said preselected reference voltage, thereby to obtain an indication of the amplitude values of said sinusoidal signal at substantially the maximum and minimum of a given cycle of said sinusoidal signal;
   (c) averaging said sampled values to obtain an indication of the median amplitude of said sinusoidal signal cycle; and
   (d) shifting the amplitude values of the sinusoidal signal half-cycle adjacent said median toward the value of said reference voltage by an amount equal to the difference between said median and said reference voltage.

6. Means for correcting errors resulting from the DC level shift, with respect to a preselected reference voltage, of a sinusoidal electrical signal generated in an electro-optical measuring system in response to displacement to be measured, said correcting means comprising:
   (a) means for generating a second signal in phase quadrature with said sinusoidal signal;
   (b) means for comparing said second signal to said preselected reference voltage and generating a sampling trigger pulse whenever the amplitude of said second signal equals said reference voltage;
   (c) means responsive to said trigger pulses for providing an indication of the amplitude of said sinusoidal signal at the time of occurrence of each such pulse, thereby to obtain an indication of the amplitude values of said sinusoidal signal at substantially the maximum and minimum of a given cycle of said sinusoidal signal;
   (d) means for averaging said maximum and minimum values to thereby obtain an indication of the median amplitude of said sinusoidal signal cycle; and
   (e) means for utilizing the value of said median amplitude to shift the amplitude values of the sinusoidal signal half-cycle adjacent said median toward the value of said reference voltage by an amount equal to the difference between said median and said reference voltage.

7. Correcting means according to claim 6 wherein said averaging means comprises:
   (a) means for providing a representative digital value of each sampled amplitude of said sinusoidal signal;
   (b) means for retaining a record of the digital values of the two most recently occurring of said sinusoidal signal amplitude values; and
   (c) means for calculating the arithmetic average of said retained digital values to thereby derive the digital value of said median amplitude.

8. Correcting means according to claim 7 wherein said utilizing means comprises calculating means for arithmetically subtracting from said median amplitude digital value the digital value of said reference voltage and for thereafter subtracting the resulting balance from the digital value of an amplitude level of said sinusoidal signal measured in said adjacent half-cycle.

9. Correcting means according to claim 6 wherein said averaging and utilizing means comprise:
   (a) holding circuit means for presenting at separate outputs voltage levels indicative of the respective amplitudes of the two most recently occurring samplings of said sinusoidal signal;

(b) resistor bridge means in electrical circuit with said holding circuit outputs and providing at the output thereof a median voltage level equal to the arithmetic average of said holding circuit output levels; and (c) differential amplifier means having as input thereto said sinusoidal signal and, at the bias input thereof, said resistor bridge output, whereby there is presented at the output of said differential amplifier means a corrected quasi-sinusoidal signal of which each half-cycle intermediate said samplings is shifted in DC level toward said reference voltage level by an amount substantially equal to the difference between said reference voltage level and said median voltage level.

* * * * *